United States Patent
Takayama

(10) Patent No.: US 7,978,363 B2
(45) Date of Patent: Jul. 12, 2011

(54) PRINTING APPARATUS AND PRINTING METHOD

(75) Inventor: Shoji Takayama, Azumino (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 1191 days.

(21) Appl. No.: 11/672,384

(22) Filed: Feb. 7, 2007

(65) Prior Publication Data

US 2007/0187508 A1    Aug. 16, 2007

(30) Foreign Application Priority Data

Feb. 15, 2006  (JP) .................................. 2006-038602
Feb. 17, 2006  (JP) .................................. 2006-041131

(51) Int. Cl.
*G06F 15/00*   (2006.01)
*G06K 1/00*    (2006.01)
*G06K 15/00*   (2006.01)
*G06F 3/12*    (2006.01)

(52) U.S. Cl. ...................................... 358/1.18; 358/1.13

(58) Field of Classification Search .................. 358/1.13, 358/1.14, 1.18, 3.28, 3.27
See application file for complete search history.

(56) References Cited

U.S. PATENT DOCUMENTS

| | | | |
|---|---|---|---|
| 2007/0035774 A1* | 2/2007 | Kubo | 358/3.28 |
| 2007/0045427 A1* | 3/2007 | Onishi | 235/494 |
| 2007/0064036 A1* | 3/2007 | Hasuike | 347/16 |
| 2007/0279474 A1 | 12/2007 | Sato | |

FOREIGN PATENT DOCUMENTS

| | | |
|---|---|---|
| JP | 11-007484 | 1/1999 |
| JP | 2000076375 A | 3/2000 |
| JP | 2003-084950 | 3/2003 |
| JP | 2003203196 A | 7/2003 |
| JP | 2004102782 A | 4/2004 |
| JP | 2004295523 A | 10/2004 |
| JP | 2005074680 A | 3/2005 |

* cited by examiner

*Primary Examiner* — Douglas Q Tran
(74) *Attorney, Agent, or Firm* — DLA Piper LLP (US)

(57) ABSTRACT

There is provided a printing apparatus including: an image creating device which creates a plurality of two-dimensional code images; an interval setting device which sets an interval between the plurality of two-dimensional code images; and a printing device which prints the plurality of two-dimensional code images having the interval set therebetween by the interval setting device.

5 Claims, 14 Drawing Sheets

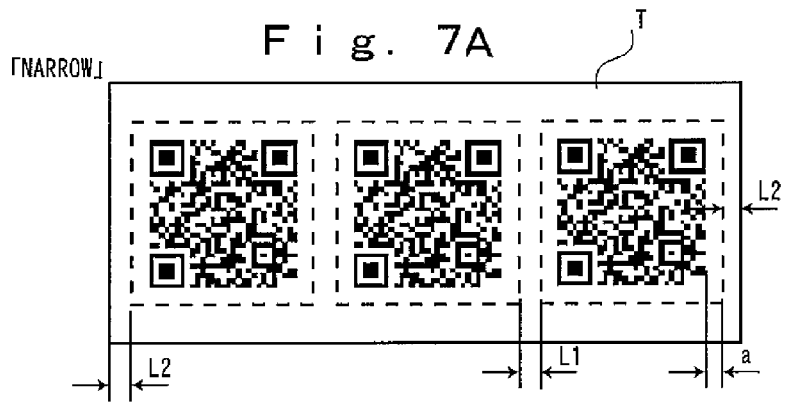
Fig. 7A 「NARROW」
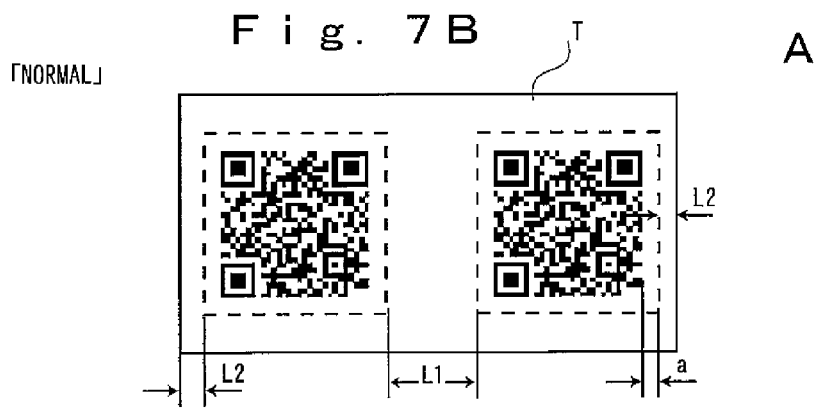
Fig. 7B 「NORMAL」
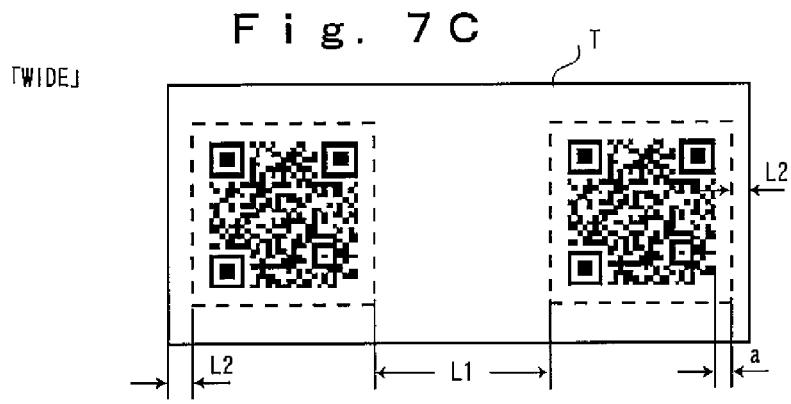
Fig. 7C 「WIDE」
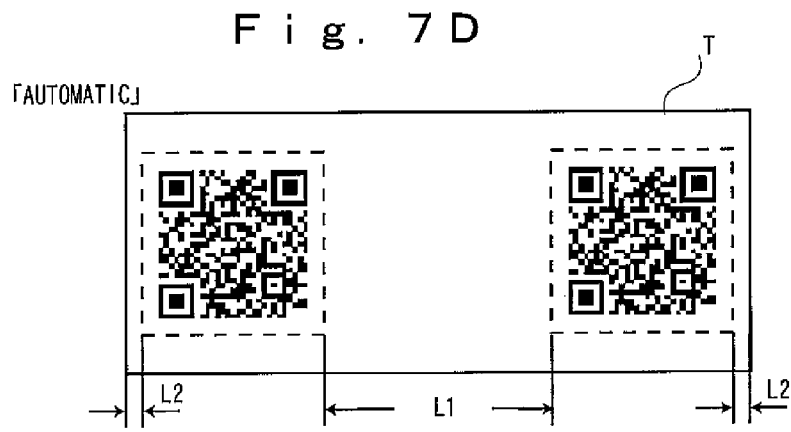
Fig. 7D 「AUTOMATIC」

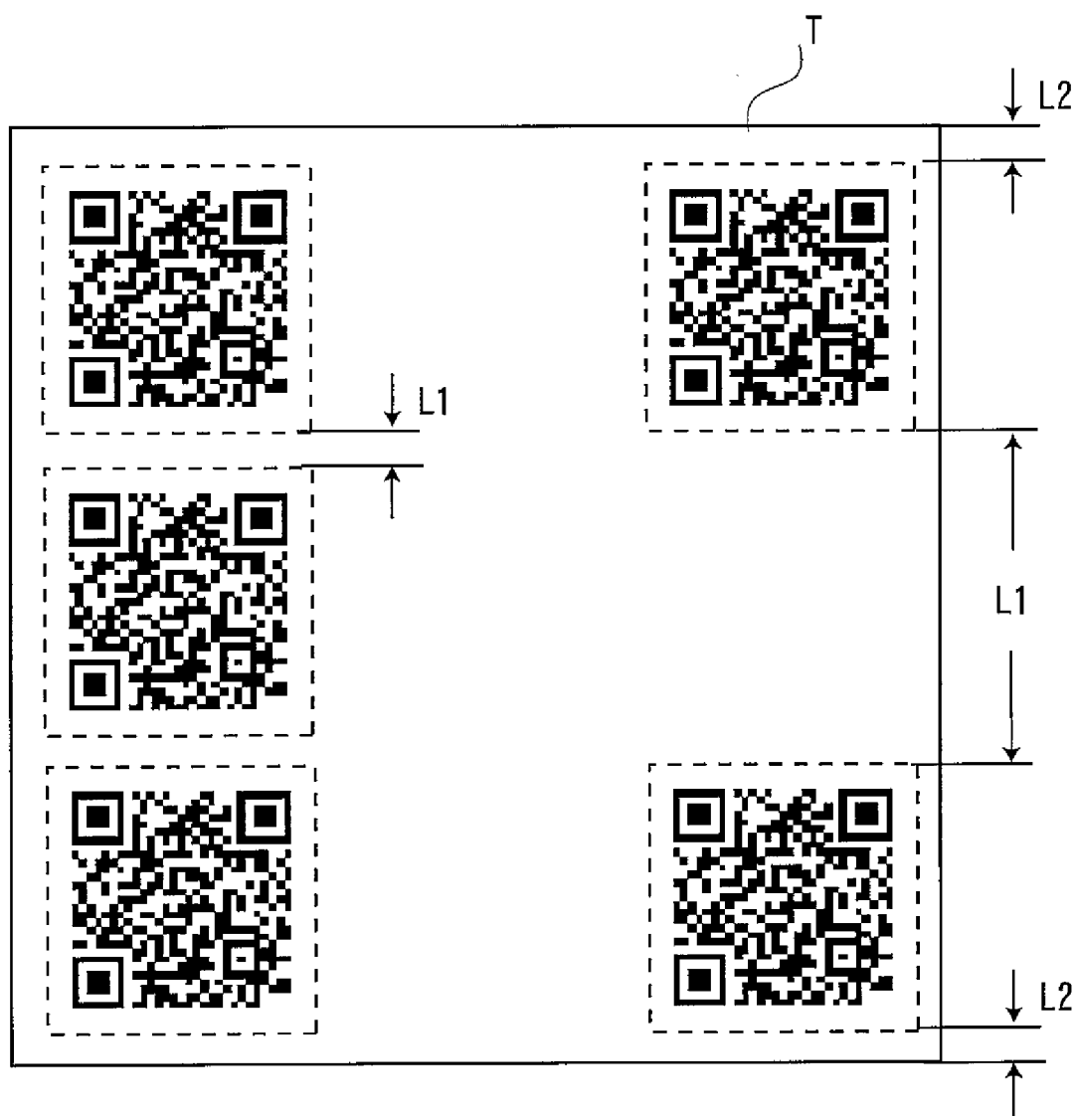

PRINTING APPARATUS AND PRINTING METHOD

The entire disclosure of Japanese Patent Application Nos. 2006-038602 filed Feb. 15, 2006 and 2006-041131 filed Feb. 17, 2006 is expressly incorporated by reference herein.

BACKGROUND

1. Technical Field

The present invention relates to a printing apparatus and a printing method for creating two-dimensional code images based on input data and printing the same on a print object.

2. Related Art

A known printing apparatus as used hitherto is of a type which has a function of dividing input data for a two-dimensional code image (QR-code image) into plural units to create a plurality of divided two-dimensional code images and that of printing the same. Reference is made to JP-A-11-007484 as an example of related art. For example, when the amount of input data exceeds the maximum data amount which can be stored in a single two-dimensional code, the printing apparatus having such a dividing function divides the input data into plural units to create a plurality of divided two-dimensional code images, with the result that the input data can be stored in the plurality of divided two-dimensional code images. In this case, the plurality of divided two-dimensional code images are printed with margins surrounding the periphery thereof in a state in which they are horizontally arranged side by side.

Furthermore, there is another known type of printing apparatus which creates two-dimensional code images and prints the same on a label sheet. Reference is made to JP-A-2003-084950 as an example of related art. Examples of creating QR-code images include a method in which the input data inputted in the printing apparatus is coded to create a single QR-code image. Besides, QR-code images can be created as a division code formed of a plurality of divided QR-code images by dividing input data into plural units and coding the same to keep more information available therein when the QR-code images are to be printed on a tape or a label having a narrow width. This is to say that, the printing apparatus of this type can print a series of input data not only as a single QR-code image but also as a plurality of divided OR-code images.

According to the configuration of JP-A-11-007484, on the other hand, there arises a primary problem involving the user's inability to set a desired interval between a plurality of divided two-dimensional code images, which in turn makes the reading thereof cumbersome. In view of this, the same problem can be caused also when a plurality of single two-dimensional code images are arranged side by side. In other words, when a plurality of two-dimensional code images are printed adjacent to each another in a state in which they are horizontally arranged side by side, it is necessary to slightly adjust the distance of a code reader such that only the two-dimensional code image as a reading object falls within the reading area of the code reader. As is often the case with a code reader (also used for reading bar codes) having a wide reading portion in particular, it is not easy to specify the reading object when reading in the lengthwise direction thereof for reasons of the shape of the reading portion, with the two-dimensional code images horizontally arranged adjacent to each other. Therefore, it is required to change the reading direction from the lengthwise direction to the lateral direction, which in turn requires a burdensome operation. In addition, when a single two-dimensional code image and a plurality of divided two-dimensional code images are printed at even intervals in a state in which they are horizontally arranged side by side, it is not possible for the user to visually distinguish one from another, which in turn makes a reading process burdensome also.

Furthermore, according to the configuration of JP-A-2003-084950, there arises a secondary problem when a single QR-code image and a plurality of divided QR-code images are printed on a label sheet side by side with the position detection patterns thereof held in the standard position, assuming that they are identical in size. This is to say that it is possible for the user to distinguish the single QR-code image from the plurality of divided QR-code images only after reading them one by one. To begin with, it is not possible even to find the mixed coexistence of the single QR-code image and the plurality of divided QR-code images. Therefore, a reading process becomes burdensome when both a single QR-code image and a plurality of divided QR-code images exist together.

SUMMARY

In view of the above deficiencies, it is an advantage of the invention to provide a printing apparatus which allows the user to freely designate an interval between two-dimensional code images and print the same, and which prints a plurality of two-dimensional code images in such a manner that the user can visually distinguish a divided two-dimensional code image constituting a division code from a single two-dimensional code image with ease. The invention has also an advantage of providing a printing method therefor.

According to one aspect of the invention, there is provided a printing apparatus. The printing apparatus comprises: an image creating device which creates a plurality of two-dimensional code images; an interval setting device which sets an interval between the plurality of two-dimensional code images; and a printing device which prints the plurality of two-dimensional code images having the interval set therebetween by the interval setting device.

According to another aspect of the invention, there is provided a printing method. The printing method comprises: an image creating step of creating a plurality of two-dimensional code images; an interval setting step of setting an interval between the plurality of two-dimensional code images; and a printing step of printing the plurality of two-dimensional code images having the interval set therebetween by the interval setting step.

According to these configurations, the user can set an interval between a plurality of two-dimensional code images considering readability or the like because he/she is permitted to set the same by himself/herself. By setting the interval to be relatively wide and printing the plurality of two-dimensional code images, for example, it is made easier to make them fall within the reading area of a code reader. As a result, the user can easily perform a reading operation. Furthermore, even with a code reader having a wide reading portion, the user can easily perform a reading operation without changing the reading direction thereof. Note that examples of two-dimensional codes include QR-code, micro QR-code, Maxi code, Vericode, data matrix, PDF 417, or the like.

In this case, it is preferable that the interval setting device secure a margin necessary for the two-dimensional code images and include a plurality of alternatives by which the interval is selected and set to make the two-dimensional code images fall within a printing medium.

According to this configuration, the user can set an interval between a plurality of two-dimensional code images by a simple operation. Furthermore, it is possible to set an interval within a proper range considering a margin necessary for two-dimensional code images and a print medium. Note that the interval between the plurality of two-dimensional code images may be either a width considering an individual margin width of the two-dimensional code images adjacent to each other or a common width corresponding to the two-dimensional code images overlapping each other.

In these cases, it is preferable that the plurality of two-dimensional code images be formed of a plurality of divided two-dimensional code images resulting from division of a series of input data.

According to this configuration, the user can set an interval between a plurality of divided two-dimensional code images according to intended purpose because he/she is permitted to set the same by himself/herself. By setting the interval to be relatively wide and printing the plurality of divided two-dimensional code images, for example, it is made easier to make a divided two-dimensional code image fall within the reading area of a code reader. As a result, the user can easily perform a reading operation. Furthermore, even with a code reader having a wide reading portion, the user can easily perform a reading operation without changing the reading direction thereof. By setting the interval to be relatively narrow, on the other hand, the relationship between the divided two-dimensional code images can be distinctly represented. Accordingly, the user can visually distinguish a single two-dimensional code image from a plurality of divided two-dimensional code images. As a result, the user can easily perform a reading operation in this respect as well.

Similarly, it is preferable that the plurality of two-dimensional code images be formed of a plurality of divided two-dimensional code images resulting from division of a series of input data and formed of a single two-dimensional code image.

According to this configuration, it is possible to set an interval between a single two-dimensional QR-code image and a plurality of divided two-dimensional code images. Accordingly, the user can easily distinguish one from another in the same manner as the above.

According to still another aspect of the invention, there is provided a printing apparatus. The printing apparatus comprises: a divided two-dimensional code image creating device which divides a series of input data into plural units and codes the same to create a plurality of divided two-dimensional code images having position marks indicative of the positions thereof, a code image rotating device which individually rotates the created plurality of divided two-dimensional code images by any rotation angle including zero degree, and a printing device which prints the rotated plurality of divided two-dimensional code images in a state in which they are arranged side by side.

Furthermore, according to still another aspect of the invention, there is provided a printing method in which a series of input data is divided into plural units and then coded to create a plurality of divided two-dimensional code images having position marks indicative of the positions thereof and the created plurality of divided two-dimensional code images are printed, wherein the created plurality of divided two-dimensional code images are individually rotated by any rotation angle including zero degree.

According to these configurations, a plurality of divided two-dimensional code images to be created are printed with the position marks thereof changed in position because they are individually rotated. As a result, the difference in position of the position marks allows the user to visually distinguish whether each of a plurality of divided two-dimensional code images printed refers to either a divided two-dimensional code image constituting a division code or a single two-dimensional code image. Therefore, even in a case in which a plurality of two-dimensional code images are printed side by side, for example, the user can easily distinguish a plurality of divided two-dimensional code images from a single two-dimensional code image. As a result, the user can smoothly perform a reading operation. Note that the plurality of divided two-dimensional code images may be rotated either by rotation angles different from each other or by the same rotation angles in which the position marks thereof are not held in the standard position.

In this case, it is preferable that the code image rotating device comprise: a rotation angle setting device which sets respective rotation angles of the plurality of divided two-dimensional code images to be rotated; and a rotation executing device which rotates the respective divided two-dimensional code images based on the rotation angles set by the rotation angle setting device.

According to this configuration, setting of respective rotation angles allows a plurality of divided two-dimensional code images to be rotated by a desired rotation angle. Note that the rotation angles set by the rotation angle setting device may be set either before or after a plurality of divided two-dimensional code images are created.

In this case, it is preferable that the rotation angle setting device be configured so as to set the rotation angles before the divided two-dimensional code image creating device creates the plurality of divided two-dimensional code images.

According to this configuration, a plurality of divided two-dimensional code images can be rotated as they are created because rotation angles are set in advance.

In this case, it is preferable that the rotation angle setting device further comprise the rotation angles set when the last divided two-dimensional code images are created, as alternatives of the rotation angles.

According to this configuration, it is not necessary to set rotation angles again when a plurality of divided two-dimensional code images are to be rotated by the rotation angles same as the last code creation. As a result, an operation can further be simplified.

According to still another aspect of the invention, there is provided a printing apparatus. The printing apparatus comprises: a divided two-dimensional code image creating device which divides a series of input data into plural units and codes the same to create a plurality of divided two-dimensional code images; and a printing device which prints the plurality of divided two-dimensional code images and an indication image representing the plurality of divided two-dimensional code images as the series of input data, the indication image being provided to the plurality of divided two-dimensional code images.

According to this configuration, an indication image allows the user to visually distinguish whether each of a plurality of divided two-dimensional code images refers to either a divided two-dimensional code image constituting a division code or a single two-dimensional code image. As a result, the user can eliminate burden of reading a plurality of divided two-dimensional code images.

In this case, it is preferable that the indication image refer to a frame image surrounding the plurality of divided two-dimensional code images in whole.

According to this configuration, a frame image surrounding a plurality of divided two-dimensional code image allows the user to distinguish whether each of the plurality of divided two-dimensional code images within a frame refers to either a divided two-dimensional code image constituting a division code or a single two-dimensional code image. Note that the frame image is not necessarily in a continuous form so long as the corner portions thereof are clearly represented.

In this case, it is preferable that the indication image refer to a plurality of character images provided to the respective divided two-dimensional code images.

According to this configuration, character images provided to respective divided two-dimensional code images allow the user to distinguish whether each of a plurality of divided two-dimensional code images refers to either a divided two-dimensional code image constituting a division code or a single two-dimensional code image. Note that the character images are preferably displayed such as "1/2" and "2/2," besides "division 1" and "division 2."

BRIEF DESCRIPTION OF THE DRAWINGS

The invention will be described with reference to the accompanying drawings, wherein like numbers reference like elements.

FIGS. 7A to 7D are illustrations, each explaining an interval setting.

FIG. 8 is an illustration explaining an interval setting in a case in which QR-code images are printed in the direction of a tape width.

DESCRIPTION OF EXEMPLARY EMBODIMENTS

Hereinafter, a description will be made about a printing apparatus according to an embodiment of the invention with reference to the accompanying drawings. The printing apparatus may be arranged by any one of a tape printer, an ink jet printer, a laser printer, or the like. In this embodiment, however, a description will now be made about a case in which the printing apparatus is applied to the tape printer. The tape printer creates two-dimensional code images, character images, or the like based on input data, prints the same on a print tape, and cuts off the printed part thereof, so as to create a label.

Figure 1:
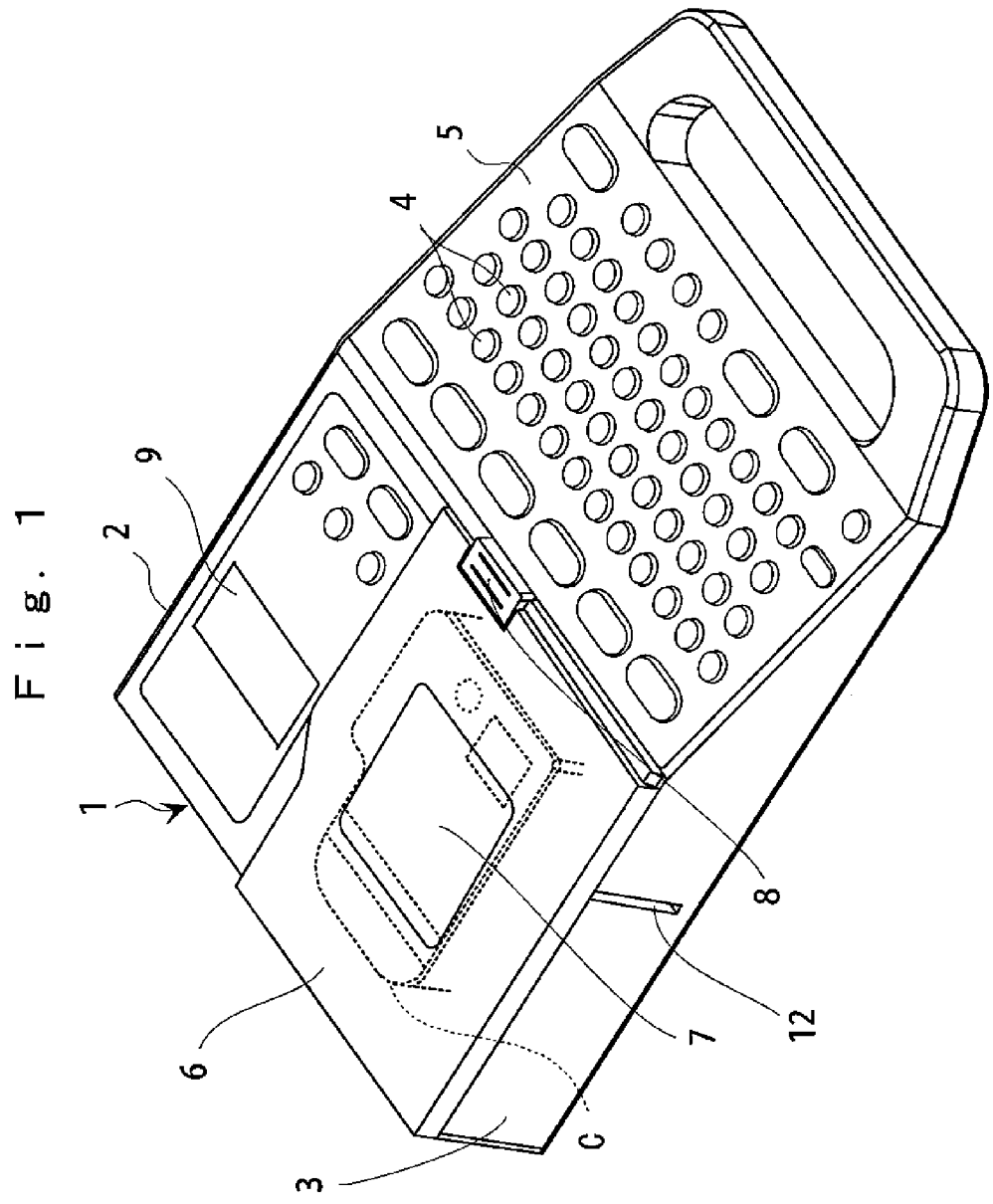
FIG. 1 is an external perspective view of a tape printer according to an embodiment with its cover closed.
Figure 2:
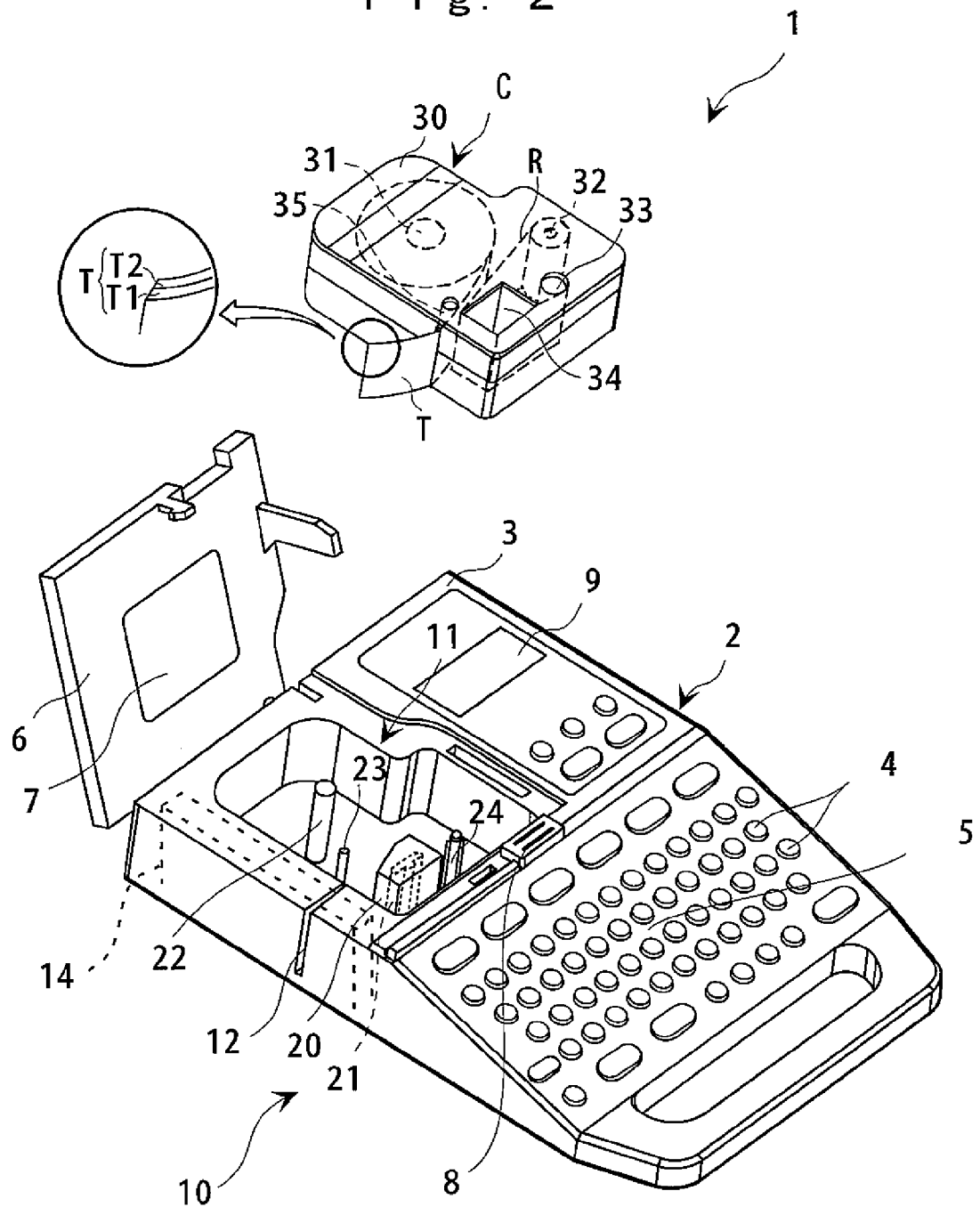
FIG. 2 is an external perspective view of the tape printer according to the embodiment with its cover opened.

As shown in FIGS. 1 and 2, the tape printer 1 has an apparatus main body 2 which performs a printing process on the print tape T and a tape cartridge C accommodating the print tape T and an ink ribbon R and detachably mounted on the apparatus main body 2.

The apparatus main body 2 has an outer shell formed by an apparatus casing 3 in which a print processing section 10 is widely arranged. The apparatus casing 3 has a keyboard 5 including various keys 4 disposed at the top surface on the front-half side thereof. At the top surface on the left rear-half side of the apparatus casing 3 is widely provided an opening and closing lid 6. At the top surface of the opening and closing lid 6 is provided a check window 7 for discriminating mounting/non-mounting state of the tape cartridge C. At the front side of the opening and closing lid 6 is provided a lid opening button 8 for opening the same. At the top surface on the right rear-half side is provided a rectangular display 9 for displaying results or the like inputted from the keyboard 5.

Inside the opening and closing lid 8 is provided a recessed cartridge mounting section 11 for receiving the tape cartridge C. In the cartridge mounting section 11 is disposed a print head 21 for performing a printing process on the print tape T reeled out from the tape cartridge C (see FIG. 2).

On the left side of the apparatus casing 3 is formed a tape ejecting slot 12 for communicating the cartridge mounting section 11 with the outside of the apparatus. The apparatus casing 3 includes a cutter unit 14 for cutting off the print tape T, which faces on the tape ejecting slot 12. The cutter unit 14 has a full cutter 15 which is driven by a motor (full-cutter motor 16) to cut off the print tape T like scissors and an ejecting mechanism (not shown) which is disposed on the downstream side in the tape feeding direction relative to the full cutter 15 and forcibly ejects the cut-off tape piece.

Although omitted in the figures, on the right side of the apparatus casing 3 are formed a power supply port for supplying power and a connector for connecting to external apparatuses such as personal computers not shown. Furthermore, although omitted in FIGS. 1 and 2, the apparatus casing 3 has mounted therein a circuit board constituting a controlling section 45 (see FIG. 3) for comprehensively controlling the apparatus casing 2.

The cartridge mounting section 11 has a print head 21 having a heater element and covered with a head cover 20, a positioning boss 22 for positioning a tape reel 31 as will be described later, a platen driving shaft 23 for feeding the print tape T and the ink ribbon R of the tape cartridge C and placed opposite to the print head 21, and a take-up driving shaft 24 for taking up the ink ribbon R, all of which are projectingly provided in the cartridge mounting section. Furthermore, at the corner of the cartridge mounting section 11 is provided a tape discriminating sensor 25 (see FIG. 3) composed of a plurality of micro switches. In a bottom plate of the cartridge mounting section 11 are incorporated a print-feeding motor 26 (see FIG. 3) for driving the platen driving shaft 23 and the take-up driving shaft 24, a reduction gear train (not shown), or the like.

The tape cartridge C has a cartridge casing 30 and a feeing port formed on the left side thereof. In the cartridge casing 30 are accommodated a tape reel 31 winding the print tape T, a ribbon feeding reel 32 winding the ink ribbon R, a ribbon taking-up reel 33 for taking up the printed ink ribbon R, and a platen roller 35. The ribbon feeding reel 32 and the ribbon taking-up reel 33 are positioned on the right lower side of the cartridge casing 30. The platen roller 35 is positioned near the feeding port and engages with the platen driving shaft 23 to be rotated therewith, corresponding to a position where the print tape T and the ink ribbon R overlap each other. Furthermore, around the left lower side of the cartridge casing 30 is formed a substantially rectangular through hole 34 into which the head cover 20 covering the print head 21 is inserted. On the rear surface of the cartridge casing C are formed a plurality of small holes for detection (not shown). A tape discriminating sensor 25 as will be described later discriminates the plurality of holes for detection so that the type of the print tape T can be discriminated.

The print tape T is composed of a recording tape T1 having an adhesive agent layer coated on the rear surface thereof and a peeling tape T2 affixed to the recording tape T1 with the adhesive agent layer. The print tape T is accommodated in the cartridge casing 30 in a rolled state with its recording tape T1 and peeling tape T2 directed outward and inward, respectively.

A description will now be made below about a series of operations for the tape printer 1. When the tape cartridge C is mounted on the cartridge mounting section 11, the head cover 20, the positioning boss 22, the take-up driving shaft 24, and the platen driving shaft 23 are inserted into the through hole 34, the tape reel 31, the ribbon taking-up reel 33, and the platen roller 35, respectively. When the opening and closing lid 6 is closed in this state, the print head 21 and the platen roller 35 are successively brought into contact with each other and sandwich the print tape T and the ink ribbon R therebetween, to create a printing standby state. Based on the print data created by a data creating apparatus and sent therefrom, the platen driving shaft 23 and the take-up driving shaft 24 cyclically rotate, and the print head 21 performs a printing process while the print tape T and the ink ribbon R are fed. The ink ribbon R subjected to the printing process runs halfway around walls of the through hole 34 and is taken up by the ribbon taking-up reel 33. The printed part of the print tape T is cut off by the full cutter 15, and the cut-off print tape T is ejected to the outside from the tape ejecting slot 12.

The display 9 is composed of a dot-matrix-type liquid crystal display and has a display screen 37 on which display image data of, for example, 256 dots×81 dots can be displayed and a plurality of indicators for displaying various setting conditions or the like. The display 9 is used when the user inputs data through keyboard 5 to create and edit print images (image data) or when he/she identifies the result thereof or the like.

Figure 3:
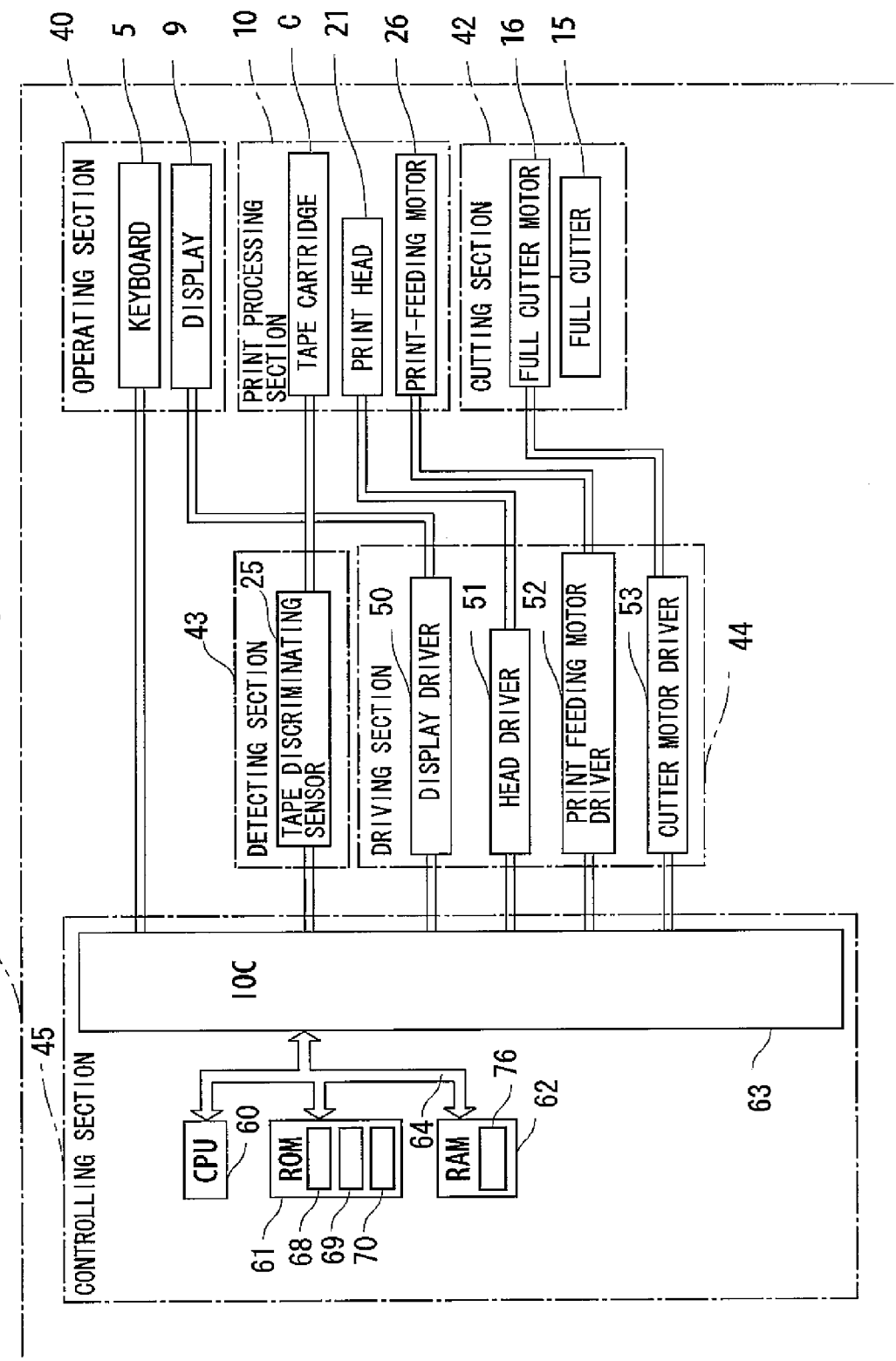
FIG. 3 is a block diagram of the tape printer.
Figure 4A:
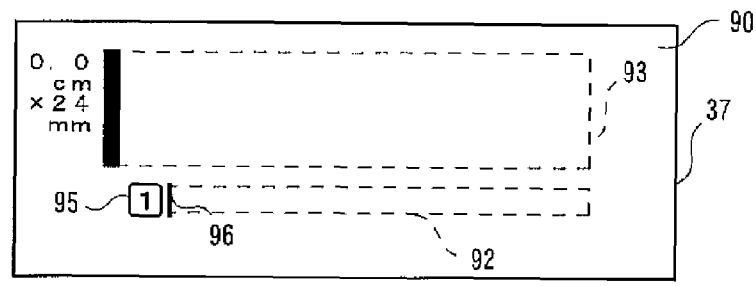
FIGS. 4A to 4D are illustrations displayed on a display, each showing an input/edit mode, a code selection menu, an application menu, and an error correction level menu.
Figure 4B:
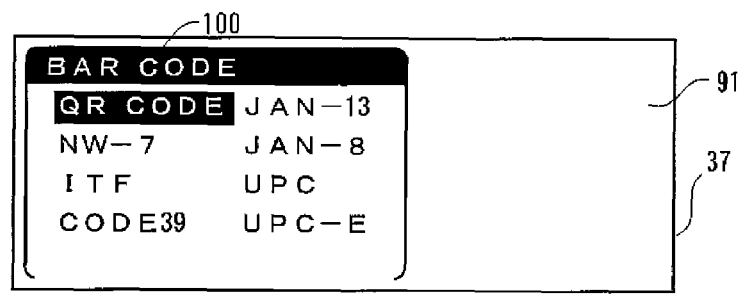
Figure 4C:
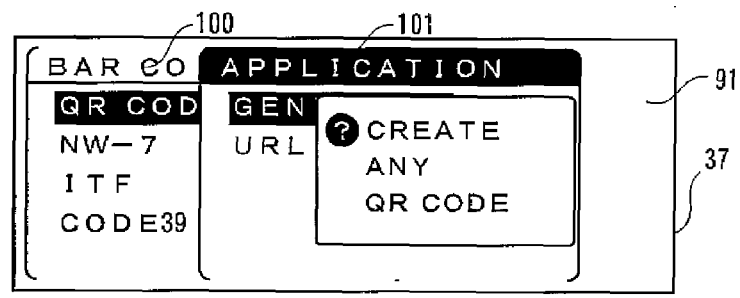
Figure 4D:
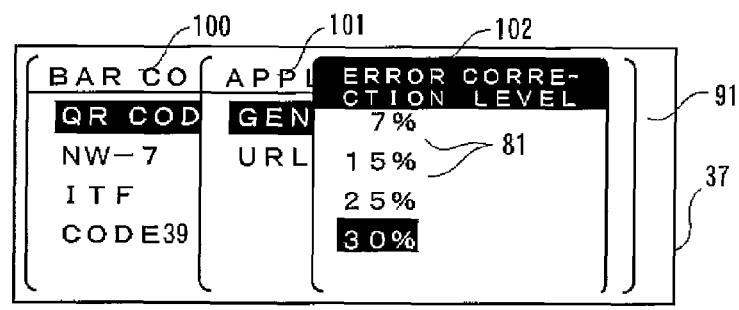

Next, a description will be made about the construction of the control system of the tape printer 1 with reference to FIG. 3. The tape printer 1 is composed of an operating section 40, a print processing section 41, a cutting section 42, a detecting section 43, a driving section 44, and a controlling section 45. The operating section 40 has the keyboard 5 and the display 9 and serves as a user interface with which the user inputs character information, displays various information, or the like. The print processing section 41 has the tape cartridge C, the print head 21, and a print feeding motor 26 and prints on the print tape T print images based on inputted character information while feeding the print tape T and the ink ribbon R. The cutting section 42 has the full cutter 15 and the full cutter motor 16 for driving the same and fully cuts the print tape T having print images thereon. The detecting section 43 has various sensors such as the tape discriminating sensor 25 and performs various detections. The driving section 44 has a display driver 50, a head driver 51, a print feeding motor driver 52, and a cutter motor driver 53 and drives each section. The controlling section 45 is connected to each section and totally controls the tape printer 1.

The controlling section 45 includes a CPU 60, a ROM 61, a RAM 62, and an Input Output Controller 63 (IOC: Input Output Controller), all of which are connected to one another through an internal bus 64. As described in detail below, the ROM 61 has stored therein a code image creating program 70 in addition to a control area 69 for storing characters (symbol, numeral, text, etc.) provided in the apparatus and a control program area 68 for storing control programs. The code image creating program 70 has: a code image creating function (image creating device) which creates bar code images or a plurality of two-dimensional code images 82 (QR-code images) based on input data 80, an error correction rate 81, and a cell size inputted through the keyboard 5; an interval setting function (interval setting device) which sets an interval between the plurality of QR-code images; or the like. Note that, in lieu of the above configuration, the code image creating program 70 may be stored in an external storage medium such as a memory card and read out from a slot provided in the tape printer 1.

The RAM 62 is used as work area for a controlling process, and includes a print buffer 76 as a code image creating area in which each information designated by the code image creating program 70 is stored or as an area in which created print images are temporarily stored. Furthermore, the RAM 62 can be supplied with power by a backup circuit, not shown, to keep stored data when the power of the tape printer 1 is turned off.

The CPU 60 receives various signals and data transmitted from each section of the tape printer 1 through the IOC 63 in accordance with the control programs stored in the ROM 61. Furthermore, the CPU 60 processes various data of the RAM 62 based on the received various signals and data and outputs the various signals and data to each section of the tape printer 1 through IOC 63, thereby performing the control of a printing process, or the like.

Figure 6A:
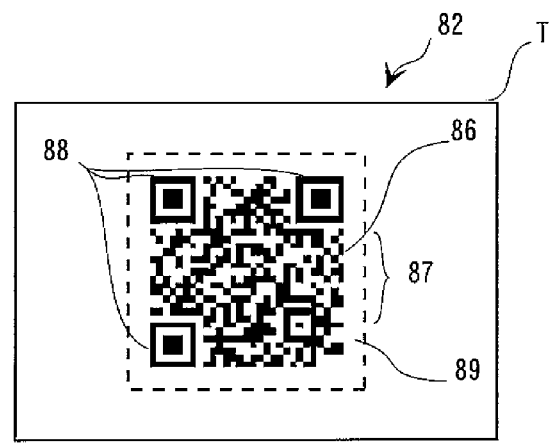
FIG. 6A is a label on which a QR-code image is printed, and FIG. 6B a label on which both a QR-code image and divided QR-code images are printed.

Furthermore, in the tape printer 1 according to this embodiment, the code image creating program 70 makes it possible to create two-dimensional code images 82 (image data) based on the input data 80 inputted through the keyboard 5. In other words, the main part of the invention of the tape printer 1 is implemented by the operating section 40 and the controlling section 45. Note that examples of two-dimensional codes include QR code, Maxi code, Veri code, data matrix, PDF 417, or the like, but a description of this embodiment will be made about a case in which, for example, the QR-code image 82 is created. The created QR-code image 82 is, as shown in FIG. 6A, of a square shape and composed of a data area 87 formed of a cell 86, position detection patterns 88 (referred to as position marks in claim) provided at the three corners, and a margin area 89 surrounding the data area 87. Furthermore, examples of parameters for setting the print size of the QR-code image 82 include the amount of input data, the size of a cell (cell size), the error correction rate 81, or the like. Moreover, a QR-code can be divided into plural units or combined with each other as the characteristic thereof. In other words, the tape printer 1 makes it possible not only to create a single QR-code image 82a based on the input data 80 but also to create a plurality of divided QR-code images 82b by dividing the input data 80 into plural units.

Hereinafter, a description will be made about a user's procedure for printing with the tape printer 1 with reference to FIGS. 4A to 4D, 5A to 5D, and 9. First, when the power key of the keyboard 5 is pressed to turn on power, the tape printer 1 is activated in an operating state in which the user can make key entry. The tape printer 1 has a plurality of modes such as an input/edit mode 90 in which any character string is inputted and edited, and a code image creating mode 91 in which QR-code images 82 and bar-code images are created. Each mode is called up by prescribed key operation, and print images are each created on the input screen dedicated to each mode. Note that the input/edit mode 90 is set as default at activating the tape printer 1 (see FIG. 4A).

Provided at the lower half part of the input/edit mode 90 is an image editing area 92 in which print images are inputted and edited. Provided at the upper half part thereof is a preview area 93 in which print preview images are displayed. Furthermore, displayed at the upper half part on the left side of the input/edit mode 90 are the length of a label corresponding to the print images being created and edited and the width of the print tape T detected by the tape discriminating sensor 25.

In the image editing area 92, a character string inputted through the keyboard 5 is displayed in the horizontal direction. When the character string extends over a plurality of rows, they are displayed side by side one above the other. Displayed also in the image editing area 92 are a line-head mark 95 for showing in what number of row each character string is positioned and a cursor 96 for indicating an position in which editing and inputting are performed. In the preview area 93 is displayed in reverse video the print images inputted and edited in the image editing area 92.

Figure 9:
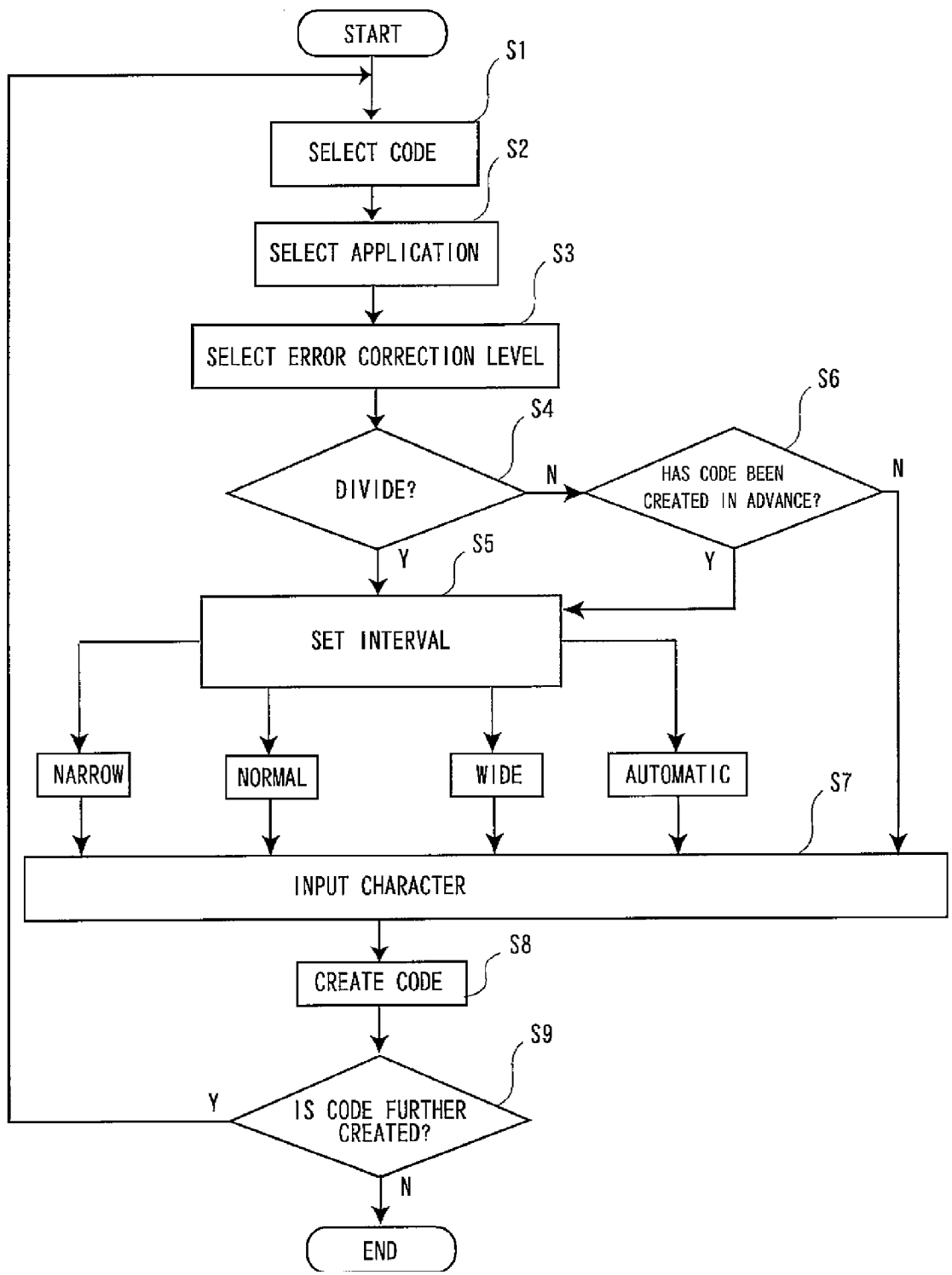
FIG. 9 is a flow chart for creating QR-code images.
Figure 10A:
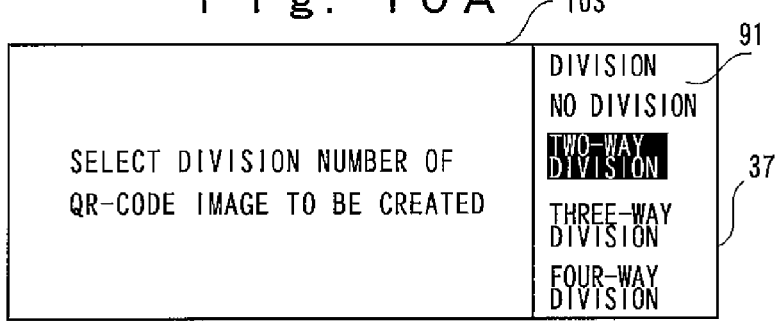
FIGS. 10A to 10D are illustrations of the display at an intermediate stage in which QR-code images are created by the tape printer according to a second embodiment.
Figure 10B:
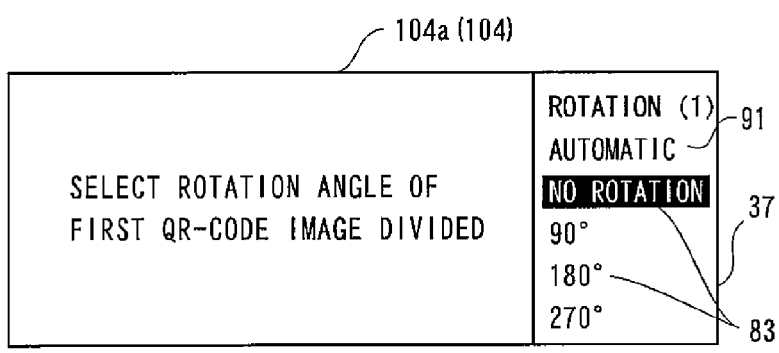
Figure 10C:
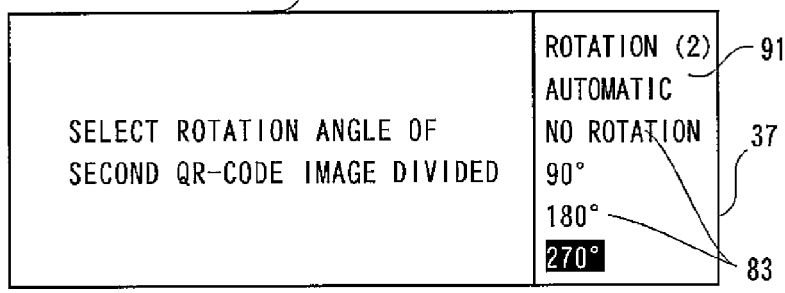
Figure 10D:
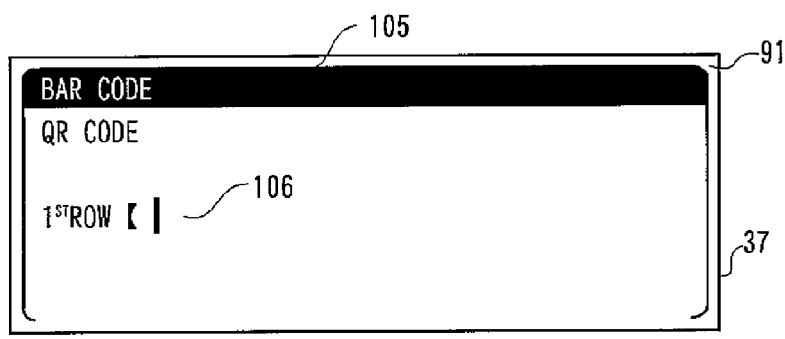

When the QR-code image 82 is created, the prescribed key operation is performed in a state in which the input/edit mode 90 is displayed, to display the code-image creating mode 91 designated to create code images. On an initial screen of the displayed code image creating mode 91 is displayed a code selection menu 100 (see FIG. 4B: FIG. 9 (S1)) in which a plurality of types of codes are selectively displayed. In addition to "QR code" as described above, the code selection menu 100 has several types of alternatives for a bar code such as "NW-7," "ITF," "CODE39," "JAN-13," "JAN-8," "UPC-A," and "UPC-E," each of which can be selected. When "QR code" is selected in this case, an application menu 101 is hierarchically displayed (see FIG. 4C: FIG. 9(S2)).

Selectively displayed in the application menu 101 are alternatives "GENERAL" and "URL," either of which is to be selected according to the usage of the QR-code image 82 to be created. The user can select either "GENERAL" for creating a desired character string or "URL" for creating addresses such as a Web site address. When a desired alternative is selected in the application menu 101, an error correction level menu 102 is hierarchically displayed (see FIG. 4D: FIG. 9(S3)).

Figure 5A:
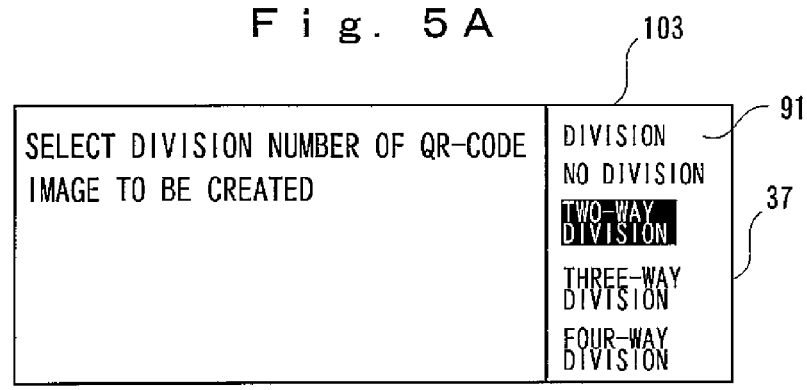
FIGS. 5A to 5D are illustrations, each showing a division setting menu, an interval setting menu, a data input screen, and a state in which QR-code images are displayed in a preview area.

Selectively displayed in the error correction level menu 102 are alternatives of the error correction rate 81 including "7%," "15%," "25%," and "30%." When a desired error correction rate 81 is selected, a division setting menu 103 for selecting the division number of QR-code images 82 to be created is displayed (see FIG. 5A: FIG. 9(S4)).

Figure 6B:
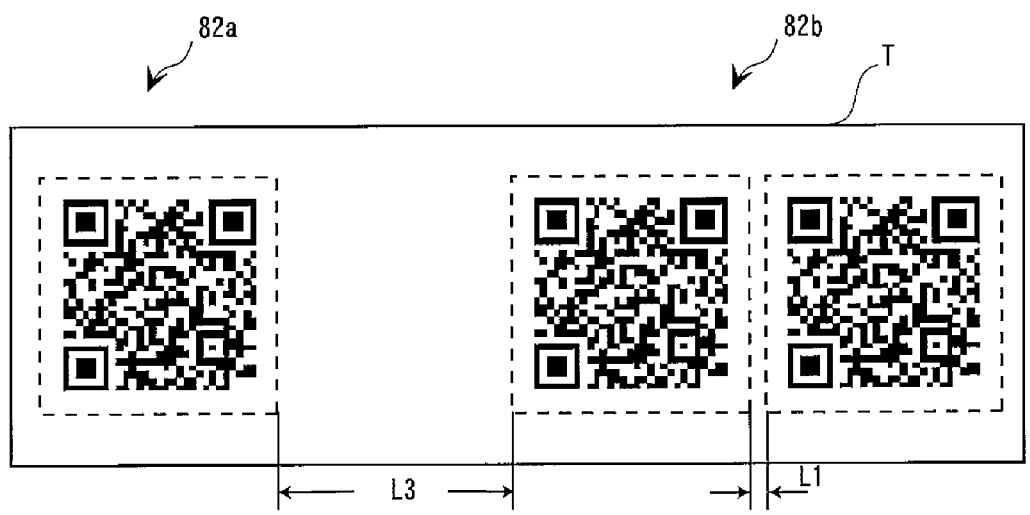

Selectively displayed in the division setting menu 103 are alternatives "NO DIVISION," "TWO-WAY DIVISION," "THREE-WAY DIVISION," and "FOUR-WAY DIVISION." When "NO DIVISION" is selected here, the screen transits to a data input screen 105 as will be described later, where a single QR-code image 82a is created based on the input data 80 inputted. When another alternative, i.e., any one of the alternatives "TWO-WAY DIVISION," "THREE-WAY DIVISION," and "FOUR-WAY DIVISION" is selected, division is carried out based on the selected division number to create divided QR-code images 82b. In other words, the dividing position of the input data 80 is set according to the data structure of the input data 80 inputted in the data input screen 105. The input data 80 is divided based on the setting, and then a plurality of divided QR-code images 82b are created based on a plurality of input data 80 thus divided (see FIG. 6B).

Figure 5B:
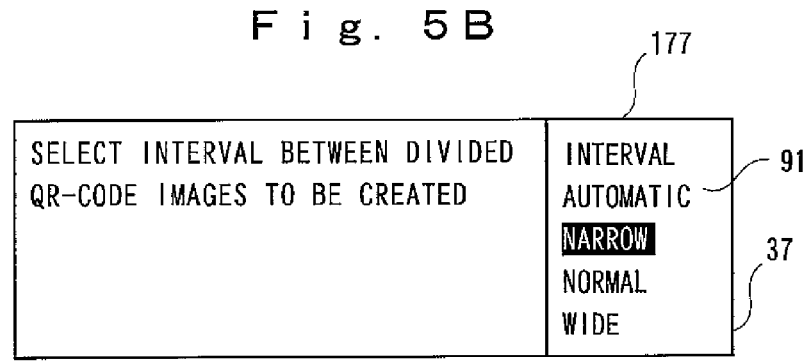

When any one of the alternatives is selected from "TWO-WAY DIVISION," "THREE-WAY DIVISION," and "FOUR-WAY DIVISION" in the division setting menu 103, an interval setting menu 177 for setting an interval L1 between the QR-code images 82 is displayed (see FIG. 5B: FIG. 9 (S5)) Furthermore, when "NO DIVISION" is selected, the data input screen 105 is displayed (see FIG. 9 (S7)). In this case, the interval setting menu 177 is configured to be displayed only when the divided QR-code images 82b or the single QR-code image 82a is created (see FIG. 9 (S6)).

The interval setting menu 177 has four alternatives "NARROW," "NORMAL," "WIDE," and "AUTOMATIC" as a margin width between the QR-code images 82, each representing "a" (four cells), "a×5" (20 cells), "a×10" (40 cells), and "any width inputted by the user" (see FIGS. 7A to 7D). Those alternatives allow the user to set the interval between the plurality of QR-code images 82, thereby making it possible to set the interval in consideration of readability or the like. Note that the interval L2 between the QR-code image positioned at both ends of the print tape T and the end portion of the print tape T is automatically set to be constant based on the structure of the apparatus.

When "WIDE" is selected and the QR-code images are printed, the interval L1 is set to be relatively wide, with the result that the QR-code images 82 can be easily fallen within the reading area of a code reader. Accordingly, the user can easily perform a reading operation. Also, even with the code reader having a wide reading portion, the user can easily perform a reading operation without changing the reading direction thereof.

Regarding the interval between the plurality of divided QR-code images 82b or that between the single QR-code image 82a and the plurality of divided QR-code images 82b, when "NARROW" is selected and the OR-code images are printed, the interval L1 is set to be relatively narrow, with the result that the relationship between the divided QR-code images 82b can be distinctly represented. In other words, even if the single QR-code image 82a and the plurality of divided QR-code images 82b exist together, the user can visually distinguish one from another and easily perform a reading operation in this respect as well (see FIG. 6B). As to the alternative "NARROW," the interval L1 may be either a width considering an individual margin width "a" of the QR-code images 82 adjacent to each other or a common width corresponding to the QR-code images 82 overlapping each other.

Note that the alternative "AUTOMATIC" may refer to a uniform interval between the QR-code images based on the tape length designated by fixed length printing and the number of images of the QR-code images 82. Furthermore, when both the single QR-code image 82a and the plurality of divided QR-code images 82b are printed, the interval L1 between the plurality of divided QR-code images 82b may be narrower than the interval L3 between the single QR-code image 82a and the plurality of divided OR-code images 82b adjacent thereto (see FIG. 6B). Accordingly, the user can visually distinguish the single QR-code image 82a from the plurality of divided QR-code images 82b with ease.

Although the interval L1 can be set in four ways according to this embodiment, it may also be set in multi-ways within the range between the margin width of "a" and that of "a×10." As shown in FIG. 8, the plurality of QR-code images 82 may be printed in a state in which they are arranged side by side in the direction of a tape width when the print tape T having a wide width is used.

Figure 5C:
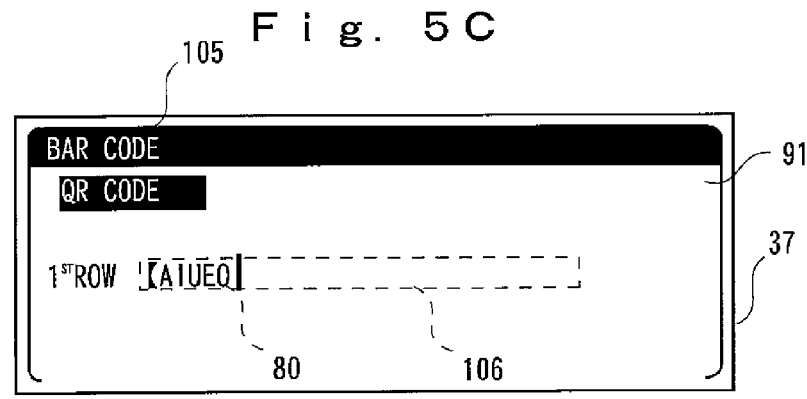

When the user selects a desired interval L1 in the interval setting menu 177, the data input screen 105 for storing input data therein is displayed (see FIG. 5C: FIG. 9 (S7)). Provided at the center of the data input screen 105 is an input data displaying area 106 in which the input data 80 inputted through the keyboard 5 is displayed. Displayed at the left of the input data displaying area 106 is the number of rows of the inputted input data 80. Any character string or the URL of a Web site selected in the application menu 101 is inputted in the input data displaying area 106. In this case, it is possible for the user to start a new line with prescribed key operation (pressing "shift"+"select" keys in this embodiment) After any character string ("AIUEO" in this embodiment) is inputted and the enter key (not shown) is pressed, the QR-code images 82 are created (FIG. 9 (S8)).

Figure 5D:
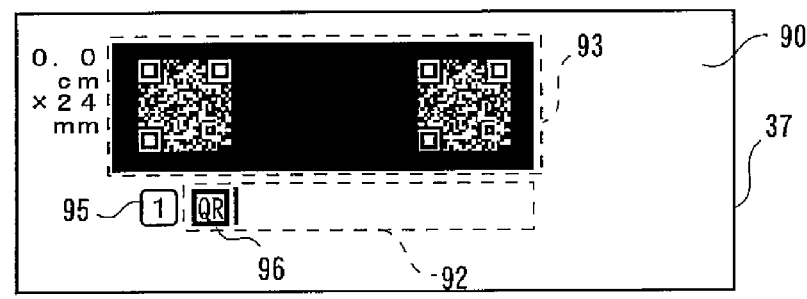

Accordingly, displayed in the preview area 93 are the plurality of QR-code images 82 having the interval set therebetween by the interval setting menu 177 (see FIG. 5D). For further creating QR-code images 82, it is necessary to repeat the operations described above (FIGS. 4A to 5C) (FIG. 9 (S9)). By performing the above operations and pressing a print button (not shown), the user can print on the print tape T the plurality of QR-code images 82 having a desired interval therebetween.

This embodiment provides an configuration in which the tape printer 1 includes the code image creating program 70. Alternatively, there may be employed a print system composed of the tape printer 1, a data creating apparatus (Personal Computer) including the code image creating program 70, and a cable for connecting the tape printer 1 and the data creating apparatus.

As described above, the tape printer 1 of this embodiment allows the user to freely designate the interval between the QR-code images 82 and print the same. Furthermore, it can make the interval so that the user can visually distinguish the single QR-code image 82a from the plurality of divided QR-code images 82b.

Next, a description will be made about the tape printer 1 according to a second embodiment with reference to FIGS. 10A to 14B. Note that only different parts will be described herein so as to avoid overlaps. In lieu of the interval setting function described above, the tape printer 1 has a code image rotating function (code image rotating device) composed of a rotation angle setting program for setting rotation angles of created QR-code images and a rotation executing program for rotating the QR-code images based on the rotation angles set by the rotation angle setting program. Also, the RAM of the tape printer 1 has provided therein a rotation angle storing area for storing the rotation angles 83 set by the rotation angle setting program. Hereinafter, a user's operating procedure for controlling the code image rotating function and the rotation angle storing area will be described with reference to FIGS. 10A to 10D and 11A to 11C.

When any one of the alternatives "TWO-WAY DIVISION," "THREE-WAY DIVISION," and "FOUR-WAY DIVISION" is selected in the division setting menu 103 as in the first embodiment, the screen transits to a rotation angle setting menu 104 in which respective rotation angles 83 for the plurality of divided OR-code images 82b are set.

Selectively displayed in the rotation angle setting menu 104 are alternatives "AUTOMATIC," "NO ROTATION," "90°," "180°," and "270°." The rotation angle setting menu 104 is sequentially displayed by the number of divisions selected in the division setting menu 103. In other words, when the alternative "TWO-WAY DIVISION" is selected in the division setting menu 103, a first rotation angle setting menu 104a for rotating one divided QR-code image 82b is displayed (see FIG. 10B). After any one of the alternatives is selected from the rotation angle setting menu 104, a second rotation angle setting menu 104b for rotating the other divided QR-code image 82b is displayed (see FIG. 10C). Note that the rotation angles 83 thus set are configured such that the QR-code images 82b rotate clockwise.

The alternative "AUTOMATIC" refers to the rotation angles 83 set in the last code creation. When this alternative is selected, the divided QR-code images 82b are rotated by the rotation angles 83 stored in the rotation angle storing area of the RAM 62. With this configuration, it is not necessary to set rotation angles 83 again when the divided QR-code images 82b are to be rotated by the rotation angles 83 same as the last code creation. After the rotation angles 83 for the respective divided QR-code images 82b are set, the screen transits to the data input screen 105 in which data to be stored in the divided QR-code images 82b is inputted (see FIG. 10D).

Figure 11A:
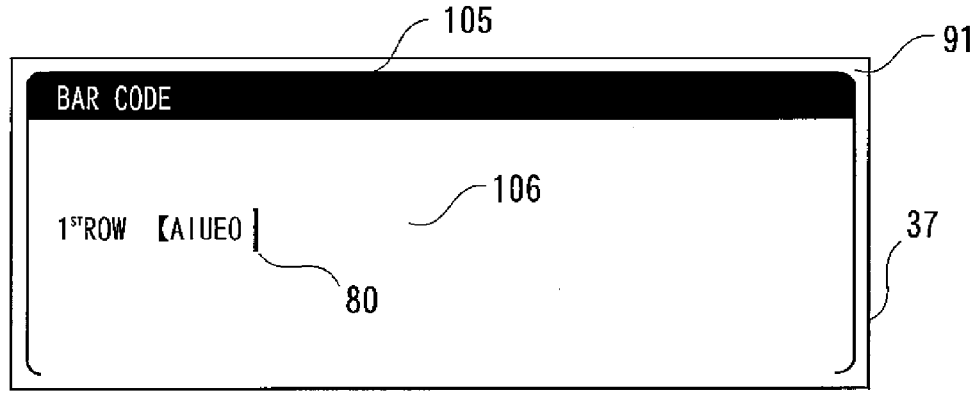
FIGS. 11A to 11C are illustrations of the display at a final stage in which the QR-code images are created.
Figure 11B:
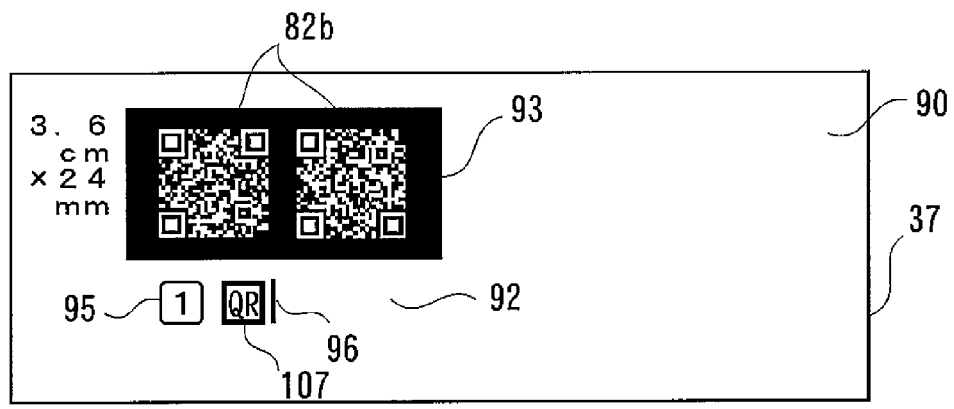

When "GENERAL" is selected in the application menu 101 described above, the user inputs a series of input data 80 formed of a desired character string in the input data displaying area 106 through the keyboard 5 and enters the inputted input data 80 with prescribed key operation (see FIG. 11A). Then, based on the above setting, the plurality of divided QR-code images 82b are rotated by the code image rotating program as the code image creating program 70 creates the plurality of divided QR-code images 82b. The screen is next switched to the input/edit mode 90. Displayed in the image editing area 92 thereof is a QR mark 107 indicative of the plurality of divided QR-code images 82b. In other words, displayed in the preview area 93 are the plurality of divided OR-code images 82b created in a state in which they are rotated (see FIG. 11B).

Figure 11C:
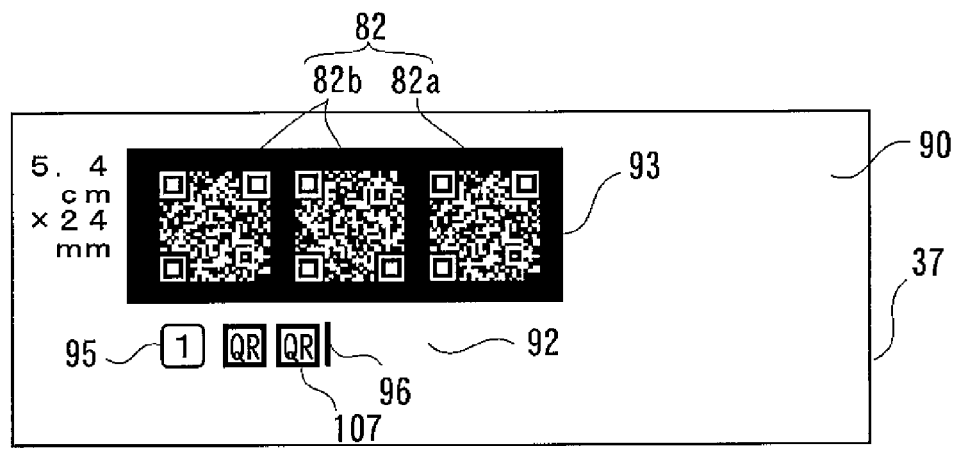
Figure 12A:
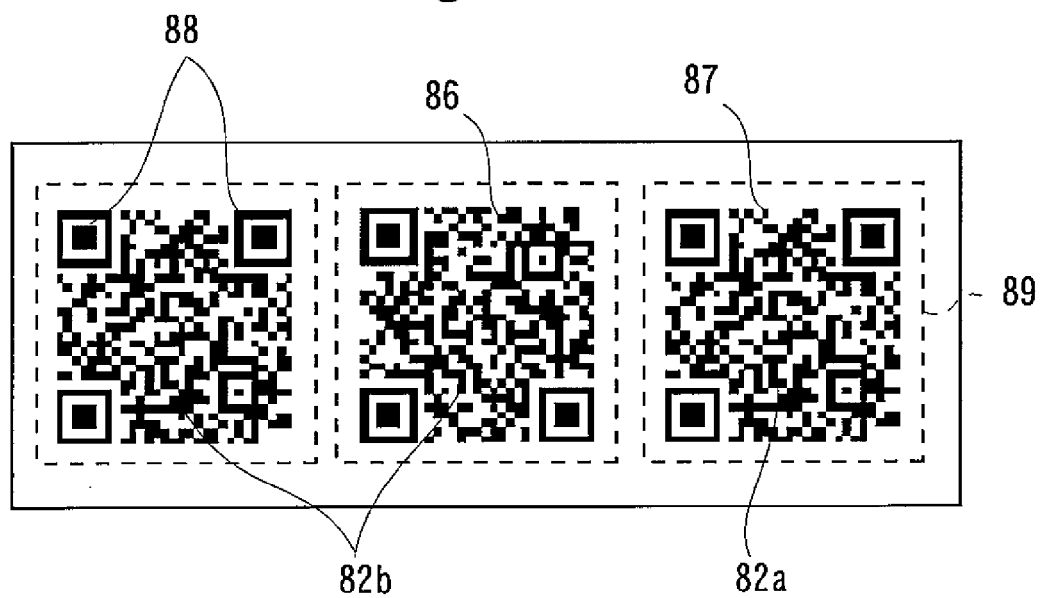
FIGS. 12A and 12B are the labels created by the tape printer.
Figure 12B:
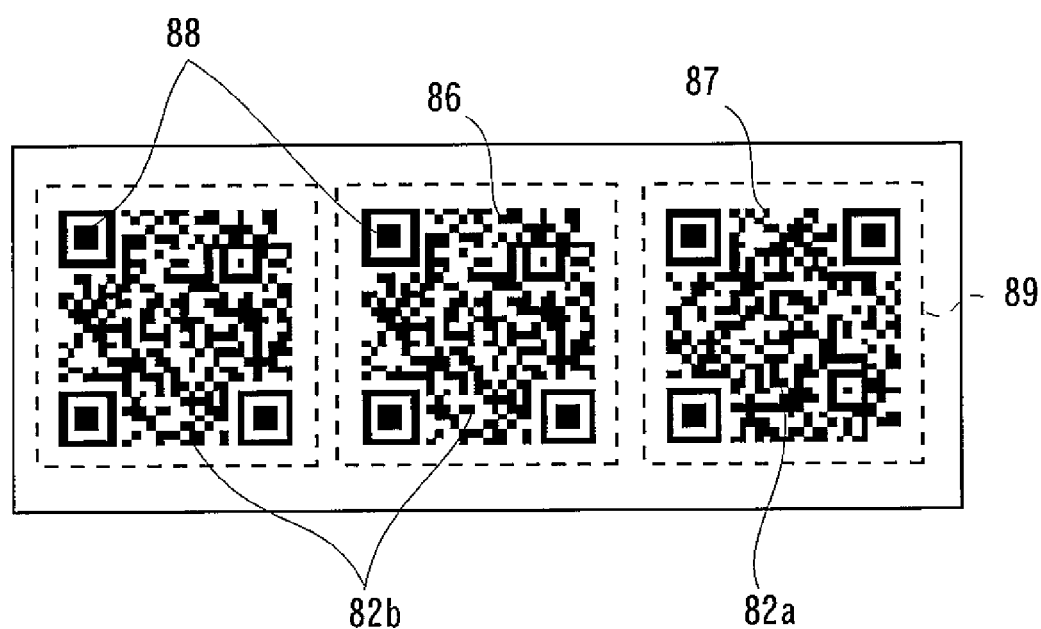

For further creating a single QR-code image 82a or a plurality of divided QR-code images 82b, it is necessary to repeat the same operating procedure as the above (see FIG. 11C). For example, when a single QR-code image 82a identical in size with a plurality of divided QR-code images 82b is created and the print button on the keyboard 5 is pressed to start printing, the plurality of divided QR-code images 82b initially created are printed in a state in which they are rotated by the set rotation angles 83 while the single QR-code image 82 secondly created is printed in the standard position. In other words, the plurality of divided QR-code images 82b are printed with the position detection patterns 88 thereof changed in position while the single QR-code image 82a is printed with that held in the standard position (see FIG. 12A).

According to the above configuration, it is possible for the user to distinguish the plurality of divided QR-code images 82b from the single QR-code image 82a based on the position detection patterns 88 different in position. Therefore, the user can visually recognize that the plurality of divided QR-code images 82b constitute the division code. As a result, the user can smoothly perform a reading operation even in a state in which the single QR-code image 82a and the plurality of divided QR-code images 82b exist together. Note that the respective rotation angles 83 for the plurality of divided QR-code images 82b may be either rotation angles different from each other or the same rotation angles 83 in which the position detection patterns thereof are not held in the standard position, so long as the user can recognize that the plurality of divided QR-code images 82 constitute the division code (see FIG. 12B). Furthermore, the rotation angles 83 have been set before the plurality of divided QR-code images 82b are created in this embodiment. Alternatively, they may be set after the plurality of divided QR-code images 82b are created.

Next, a description will be made about a modified example according to the tape printer 1 of the second embodiment. In lieu of the code image rotating program, the ROM 61 of the tape printer 1 has stored therein a frame image providing program which provides a frame image 110 to surround the plurality of divided QR-code images 82 in whole. Hereinafter, a user's operating procedure will mainly be described with reference to FIGS. 13A and 13B.

Figure 13A:
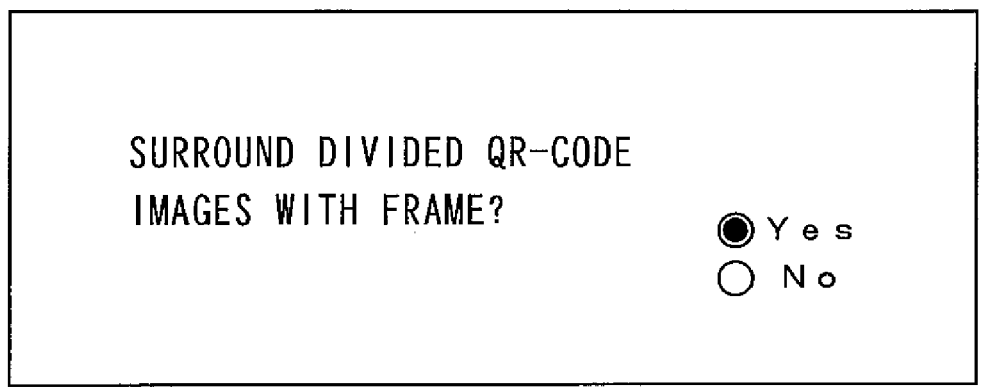
FIGS. 13A and 13B are illustrations of a display in a process in which QR-code images are created in a modified example of the tape printer according to the second embodiment.
Figure 13B:
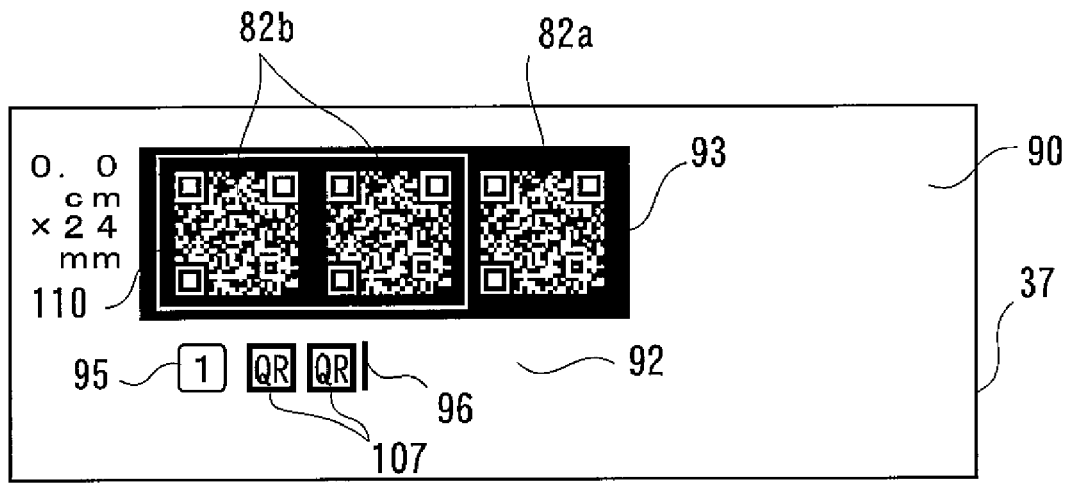

When the division number is set in the division setting menu 103 as in the first embodiment, an alternative as to whether or not the frame image 110 is to be provided is displayed (see FIG. 13A). When the frame image 110 is set here, the screen transits to the data input screen 105. After a desired character string is inputted and the input data 80 is entered, the plurality of divided QR-code images 82b provided with the frame image 110 are created. Accordingly, displayed in the preview area 93 of the input/edit mode 90 are the plurality of divided QR-code images 82b created based on the above setting and the frame image 110 provided so as to surround the plurality of divided QR-code images 82b in whole (see FIG. 13B). Note that the frame image 110 may be either a decorated frame image or an image such as a parenthesis so as to surround the four corners of the plurality of divided QR-code images 82b.

Figure 14A:
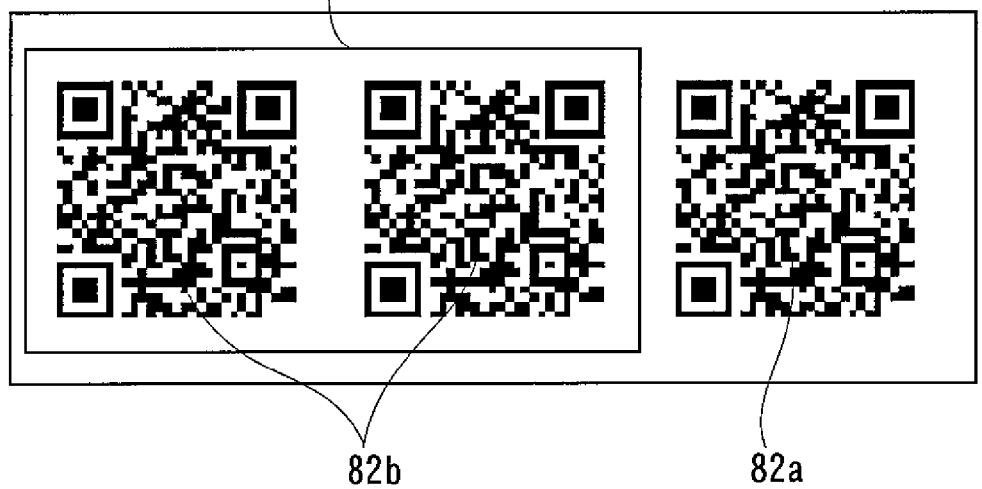
FIGS. 14A and 14B are the labels created by the tape printer.
Figure 14B:
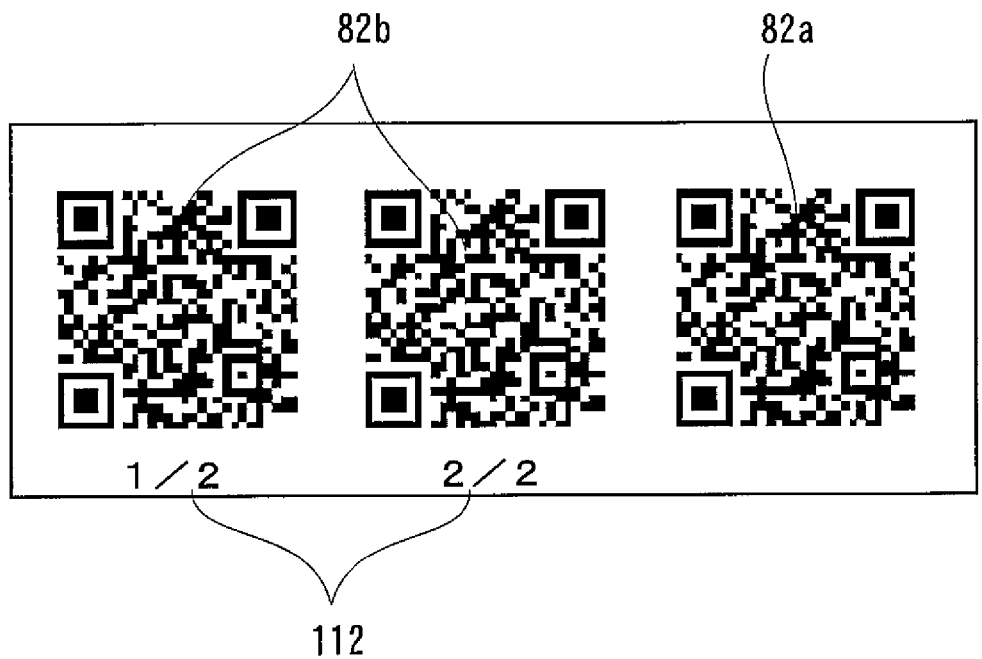

According to the above configuration, the user can visually recognize whether each of the plurality of divided QR-code images 82b within the frame image 110 refers to either a divided QR-code image 82b constituting a division code or a single QR-code image 82a. Therefore, even if the single QR-code image 82a and the plurality of divided QR-code images 82b are arranged side by side, it is possible for the user to smoothly read the plurality of divided QR-code images 82b. Note that character images 112 may replace the frame image 110 and be provided to the plurality of divided QR-code images 82b. The character images 112 shown in FIG. 14B are formed of denominators representing the division number and numerators representing serial numbers of one and two. Furthermore, the character images 112 such as "division 1" and "division 2" may be provided as another example. In other words, the character images 112 may be freely provided so long as they indicate that the plurality of divided QR-code images 82b refer to a series of input data 80.

What is claimed is:

1. A printing apparatus comprising:
    an image creating device which creates a plurality of two-dimensional code images;
    an interval setting device which sets an interval between the plurality of two-dimensional code images, secures a margin necessary for the two-dimensional code images, and includes a plurality of alternatives by which the interval is selected and set to make the two-dimensional code images fall within a printing medium; and
    a printing device which prints the plurality of two-dimensional code images having the interval set therebetween by the interval setting device.

2. The printing apparatus according to claim 1, wherein the plurality of two-dimensional code images are formed of a plurality of divided two-dimensional code images resulting from division of a series of input data.

3. The printing apparatus according to claim 1, wherein the plurality of two-dimensional code images are formed of a plurality of divided two-dimensional code images resulting from division of a series of input data and formed of a single two-dimensional code image.

4. A printing method comprising:
    an image creating step of creating a plurality of two-dimensional code images;
    an interval setting step of setting an interval between the plurality of two-dimensional code images, wherein a margin necessary for the two-dimensional code images is secured and a plurality of alternatives are included by which the interval is selected and set to make the two-dimensional code images fall within a printing medium; and
    a printing step of printing the plurality of two-dimensional code images having the interval set therebetween by the interval setting step.

5. A printing apparatus comprising:
    an image creating device which creates a plurality of two-dimensional code images formed of a plurality of divided two-dimensional code images resulting from division of a series of input data and formed of a single two-dimensional code image;
    an interval setting device which sets an interval between the plurality of two-dimensional code images; and
    a printing device which prints the plurality of two-dimensional code images having the interval set therebetween by the interval setting device.

* * * * *